United States Patent
Adams

(10) Patent No.: US 8,301,120 B2
(45) Date of Patent: Oct. 30, 2012

(54) METHOD AND SYSTEM OF TRANSPORT MODE NOTIFICATION ON A MULTI-MODE HANDHELD COMMUNICATION DEVICE

(75) Inventor: Neil P. Adams, Waterloo (CA)

(73) Assignee: Research In Motion Limited, Waterloo, ON (CA)

(*) Notice: Subject to any disclaimer, the term of this patent is extended or adjusted under 35 U.S.C. 154(b) by 1220 days.

(21) Appl. No.: 11/743,487

(22) Filed: May 2, 2007

(65) Prior Publication Data
US 2008/0273489 A1 Nov. 6, 2008

(51) Int. Cl.
*H04M 3/16* (2006.01)
(52) U.S. Cl. ........... 455/412.2; 455/412.1; 455/426.1; 455/405; 455/500; 455/566; 455/575.7
(58) Field of Classification Search .......... 455/67.6, 455/412.2
See application file for complete search history.

(56) References Cited

U.S. PATENT DOCUMENTS

| | | | |
|---|---|---|---|
| 5,710,986 A * | 1/1998 | Obayashi et al. | 455/553.1 |
| 5,825,775 A | 10/1998 | Chin | |
| 6,415,159 B1 * | 7/2002 | Miyashita | 455/558 |
| 6,733,333 B1 | 5/2004 | Chen | |
| 7,072,468 B2 | 7/2006 | Murray | |
| 7,100,116 B1 * | 8/2006 | Shafrir et al. | 715/751 |
| 7,187,923 B2 * | 3/2007 | Mousseau et al. | 455/416 |
| 7,403,776 B2 * | 7/2008 | Suetaka et al. | 455/432.3 |
| 2004/0045027 A1 | 3/2004 | Takamura et al. | |
| 2004/0203674 A1 * | 10/2004 | Shi et al. | 455/415 |
| 2004/0218562 A1 * | 11/2004 | Orava et al. | 370/329 |
| 2005/0020286 A1 * | 1/2005 | Lazaridis et al. | 455/466 |
| 2005/0152304 A1 * | 7/2005 | Park | 370/328 |
| 2006/0159048 A1 * | 7/2006 | Han et al. | 370/331 |
| 2008/0113665 A1 * | 5/2008 | Paas et al. | 455/426.1 |

FOREIGN PATENT DOCUMENTS

| | | |
|---|---|---|
| DE | 203 03 478 U | 3/2003 |
| EP | 1517575 | 5/2005 |

OTHER PUBLICATIONS

Nokia, User's Guide for Nokai N73, 2006.*
Manual 63101, Nokia, 2002, XP007903241.
Tungsten T2 Manual, 3COMM, Apr. 13, 2005, XP007903240.
Corresponding European Patent Application No. 07107385.2—Summons to Attend Oral Proceedings.

* cited by examiner

*Primary Examiner* — Olumide T Ajibade Akonai
*Assistant Examiner* — Randy Peaches
(74) *Attorney, Agent, or Firm* — Perry + Currier

(57) ABSTRACT

A communications device includes multiple data transceivers, each configured for communication via a respective communication transport mode. The communication device has one or more data packets which are associated with one of the communication transport modes. The handheld communication device transmits or receives the data packet(s) via the data transceiver that is configured for communication with the corresponding communication transport mode. A user-indication of the communication transport mode of the data packet(s) is provided in accordance with the data transceiver that communicates the data packet(s). The user indication is provided on a per-data packet basis, substantially contemporaneously with the communication of the data packet(s) via the one data transceiver.

18 Claims, 10 Drawing Sheets

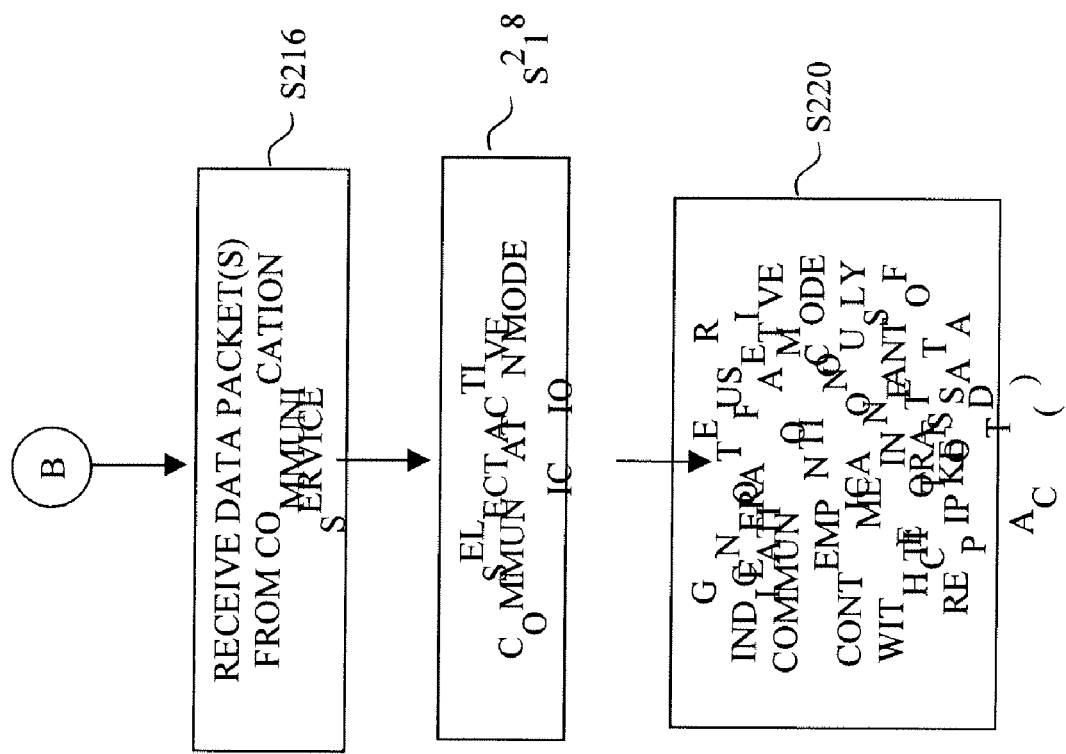

METHOD AND SYSTEM OF TRANSPORT MODE NOTIFICATION ON A MULTI-MODE HANDHELD COMMUNICATION DEVICE

FIELD OF THE INVENTION

The invention described herein relates to a handheld communication device that is capable of communicating over different communication transport modes.

BACKGROUND OF THE INVENTION

Many modern handheld communication devices are configured to operate under multiple wireless communication modes. Configuring a single communication device to communicate over different communication modes obviously enhances the versatility of the device. However, this enhanced versatility can be problematic since the user often has limited control over the communication modes that are available at any given time.

Attempts have been made to provide the user with information concerning the current service mode of the communication device. For instance, Murray (U.S. Pat. No. 7,072,468) describes a wireless telephone that includes a pair of light sources, each located within the telephone housing, for visually indicating the active service mode (cellular/dispatch) to the user. Shi (US 2004/0203674) describes a wireless telephone that presents a call display screen listing various communication parameters associated with a call, including status (active/hold), type (voice/data), activity (TX/RX), service type (packet-switched/circuit-switched), and mode (GSM/GPRS/CDMA).

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
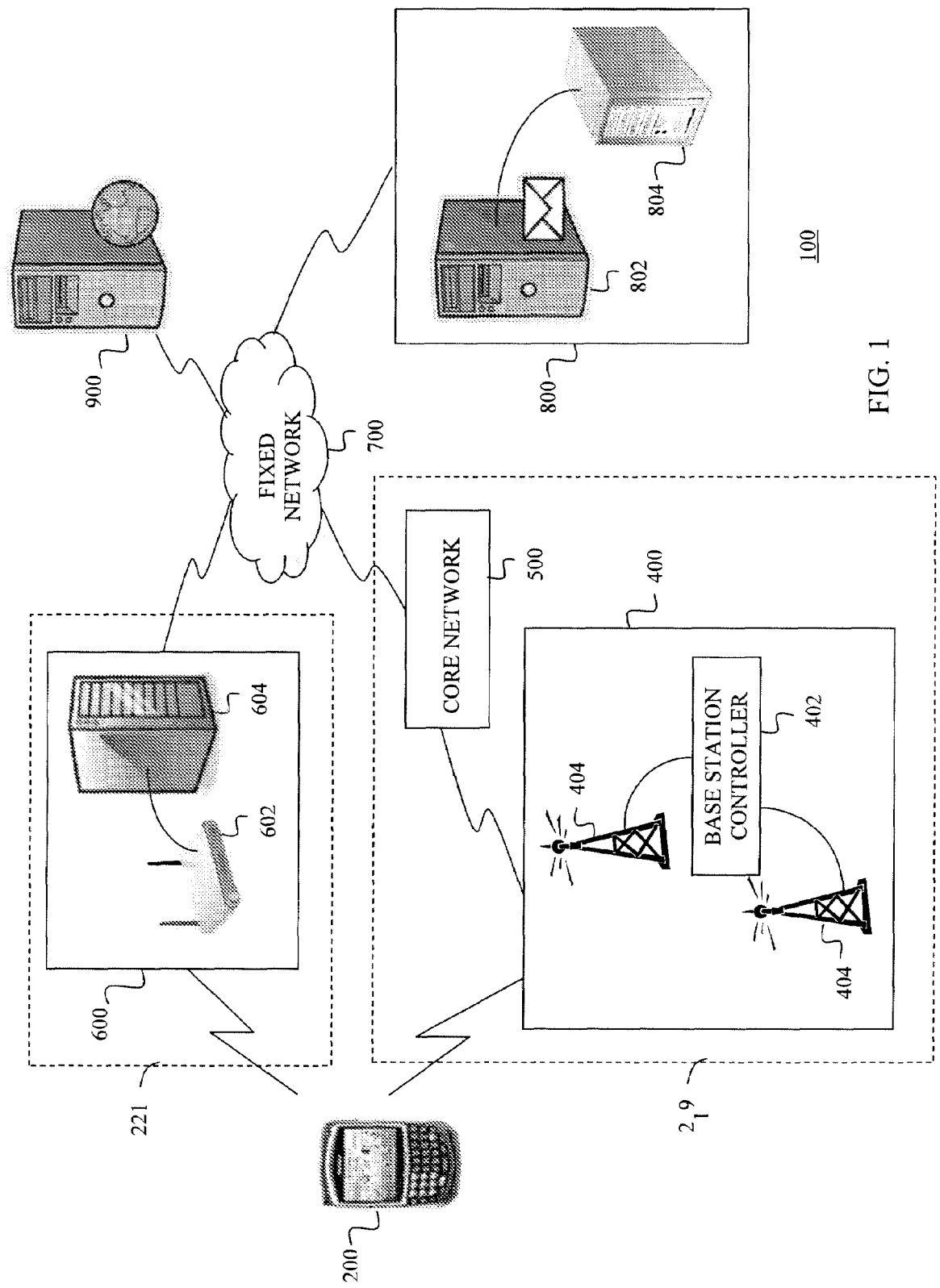
FIG. 1 is a schematic diagram depicting a communications network, including the handheld communications device according to the invention.

By way of overview, the invention described herein relates to a handheld communication device that is capable of multiple communication transport modes and provides a user-indication of the active transport mode of one or more data packets contemporaneously with the transmission or receipt of the data packets at the handheld communication device.

As will be described in further detail below, in accordance with a first aspect of the invention, there is provided a method of communication in a handheld communication device that is capable of a plurality of communication transport modes. The handheld communication device comprising a plurality of data transceivers, with each data transceiver being configured for communication using a respective one of the communication transport modes.

The method, according to this first aspect of the invention, begins by receiving at least one data packet at the handheld communication device. The data packet(s) is/are associated with one of the communication transport modes. The handheld communication device communicates the data packet(s) via one of the data transceivers. The one data transceiver is configured for communication using the one communication transport mode.

Then, the method provides a user-indication of the communication transport mode for the data packet(s), in accordance with the one data transceiver. The user indication is provided on a per-data packet basis, substantially contemporaneously with the communication of the data packet(s) via the one data transceiver.

In accordance with a second aspect of the invention, there is provided a communications device that comprises a plurality of data transceivers, communication transport mode determining means, and communication transport mode indicating means. Each data transceiver is configured for communication via a respective one of the communication transport modes.

The communication transport mode determining means is in communication with the data transceivers, and determines the transport mode of at least one data packet that is received at the handheld communications device. The handheld communication device is configured to communicate the data packet(s) via one of the data transceivers. The data packet(s) is/are associated with one of the communication transport modes.

The communication transport mode indicating means is in communication with the communication transport mode determining means, and provides a user-indication of the one communication transport mode for the data packet(s). The communication transport mode indicating means provides the user indication on a per-data packet basis, substantially contemporaneously with the communication of the data packet(s) via the one data transceiver.

In accordance with a third aspect of the invention, there is provided a computer readable medium that carries processing instructions for an electronic communications device that is capable of a plurality of communication transport modes. The electronic communication device comprising a plurality of data transceivers, with each data transceiver being configured for communication using a respective one of the communication transport modes. The processing instructions, when executed by a computer processor of the communications device, enables the device to implement a data communication method in the communication device.

The data communication method, according to this third aspect of the invention, begins by receiving at least one data packet at the electronic communication device. The data packet(s) is/are associated with one of the communication transport modes. The electronic communication device communicates the data packet(s) via one of the data transceivers.

The one data transceiver is configured for communication using the one communication transport mode.

Then, the data communication method provides a user-indication of the communication transport mode for the data packet(s), in accordance with the one data transceiver. The user indication is provided on a per-data packet basis, substantially contemporaneously with the communication of the data packet(s) via the one data transceiver.

As will be described below, in a preferred implementation the communication may be a reception of the data packet(s) via one of the communication transport modes, or a transmission of the data packet(s) from the communication software for subsequent transmission over one of the communication transport modes. Preferably, the user-indication indicates the associated communication transport mode, and that the computing device is communicating (transmitting or receiving) the data packet(s).

Further, preferably the communications device comprises a display device, the user-indication comprises an icon, and the communication transport mode indicating means renders the icon on the display device. Further, preferably the communications device is configured to render a plurality of information screens on the display device, and the communication transport mode indicating means renders the icon on a communication status region of the display device, with the status region being visible from the information screens.

Preferably, the communication transport mode indicating means renders the icon with a first icon configuration for one of the communication transport modes, and with a second configuration for another of the communication transport modes, with the second icon configuration being different from the first configuration. Each icon when rendered with the second icon configuration preferably has a different appearance than the first icon configuration.

Further, in the preferred implementation, one of the communication transport modes comprises a long-range and/or a slow-speed wireless cellular data communication protocol (such as GPRS (General Packet Radio Service) and/or EDGE (Enhanced Data rates for GSM Evolution)), and another one of the communication transport modes comprises a short-range and/or a high speed WiFi (Wireless Fidelity) data communication protocol (such as IEEE 802.11x and/or Bluetooth).

Turning now to FIG. 1, a communications network, generally as 100, is shown comprising at least one wireless communications device 200, and a wireless communications network and a wired communications network both in communication with the wireless communications devices 200. The wireless communications network comprises a primary wireless network 219 and a secondary wireless network 221.

In the embodiment shown, the primary wireless network 219 comprises a long-range cellular network, and the secondary wireless network comprises a short range local area wireless network. However, the wireless communications network is not limited to any particular number or configuration of wireless networks. For instance, the primary and secondary wireless networks 219, 221 may both comprise long-range cellular networks, or short range wireless networks. Further, the wireless communications network may comprises a plurality of long-range cellular networks and/or a plurality of short range wireless networks.

As shown, the long-range wireless cellular network 219 comprises a plurality of remote base station subsystems (BSSs) 400, and a core network 500 in communication with the BSSs 400. The short-range local area network 221 comprises at least one local wireless node 600. The wired communications network comprises at least one e-mail service 800, at least one web server 900, and a fixed network 700 in communication with the long-range wireless cellular network 219, the short-range local area network 221, the e-mail services 800 and the web servers 900.

The BSSs 400 of the long-range wireless cellular network 219 communicate with the core network 500 via a wired or optical link, and provide a bridge between the wireless communications devices 200 and the core network 500.

As shown, each BSS 400 includes a Base Station Controller (BSC) 402 and a plurality of Base Transceiver Stations (BTSs) 404. Each BTS 404 includes one or more radio transceivers, the coverage area of each defining a long-range radio system cell. Preferably, the BTSs 404 are configured to communicate with the wireless communications devices 200 over the radio system cells via a long-range wireless communications protocol, such as GSM and/or Code Division Multiple Access (CDMA). However, the BSSs 404 may implement other long-range communication protocols.

Each BTS 404 is connected to the BSC 402 via a wired or optical link. The BSC 402 acts as a physical connection between the handheld communications device 200 and the core network 500.

Preferably, the core network 500 facilitates digital communication between the handheld communications devices 200 and the fixed network 700. Further, preferably the core network 500 implements slow-speed data (e.g. GPRS or EDGE) and/or telephony communications protocols. The core network 500 communicates with the fixed network 700 via a wired or optical link, and acts as switching node to the fixed network 700. Typically, the fixed network 700 comprises a Public Switched Telephone Network (PSTN) or an Integrated Services Digital Network (ISDN).

The local wireless node 600 of the short-range wireless local area network 221 communicates with the fixed network 700 via a wired or optical link, and provides a bridge between the local wireless communications devices 200 and the fixed network 700. As shown, the local wireless node 600 includes a wireless base station 602, and a local base station controller 604 coupled to the wireless base station 602.

The base station 602 includes one or more radio transceivers, the coverage area of each defining a local area cell. Preferably, the base station 602 communicates with the local wireless communications devices 200 over the local area cell via a short-range high-speed wireless communications protocol, such as IEEE 802.11x and/or Bluetooth. However, the wireless base station 602 may implement other short-range wireless communications protocols.

The base station 602 is connected to the local base station controller 604 via a wired or optical link. The local base station controller 604 acts as a physical connection between the handheld communications device 200 and the fixed network 700, and facilitates digital communication between the handheld communications devices 200 and the fixed network 700. The local base station controller 604 communicates with the fixed network 700 via a wired or optical link.

The local wireless node 600 may be implemented within a private institution, in which case the local base station controller 604 provides restricted access to the fixed network 700 to only wireless communications devices 200 that are registered users of the local wireless node 600. Alternately, the local wireless node 600 may be implemented at public site, in which case the local base station controller 604 provides unrestricted access to the fixed network 700.

Each e-mail service 800 comprises an e-mail server 802 and an authorization database 804 in communication with the e-mail server 802, and provides e-mail services for the handheld communications devices 200. The e-mail server 802 maintains an e-mail account for each registered user of the e-mail service 800, including the e-mail messages that are sent from and received in each e-mail account. Typically, the e-mail server 802 comprises a Microsoft Outlook Exchange Server, Novell Groupwise Server or other e-mail server solution, configured with a Blackberry Enterprise Server option.

The authorization database 804 includes authorization records for each e-mail account. Typically, the authorization records comprise unique Personal Identification Number (PIN) entries which identify the handheld communications device 200 associated with each e-mail account, and encryption keys which the e-mail server 802 uses for the encrypted delivery of e-mail messages between the e-mail server 802 and the handheld communications devices 200.

Each web server 900 implements a web site having content for rendering on the handheld communications devices 200. Preferably, the web server 900 provides the handheld communications devices 200 with web pages that have limited content. Alternately, or additionally, the web server may serve web pages that are written in WML (Wireless Markup Language). The web server 900 may be publicly available, or may be deployed behind a firewall.

Figure 2:
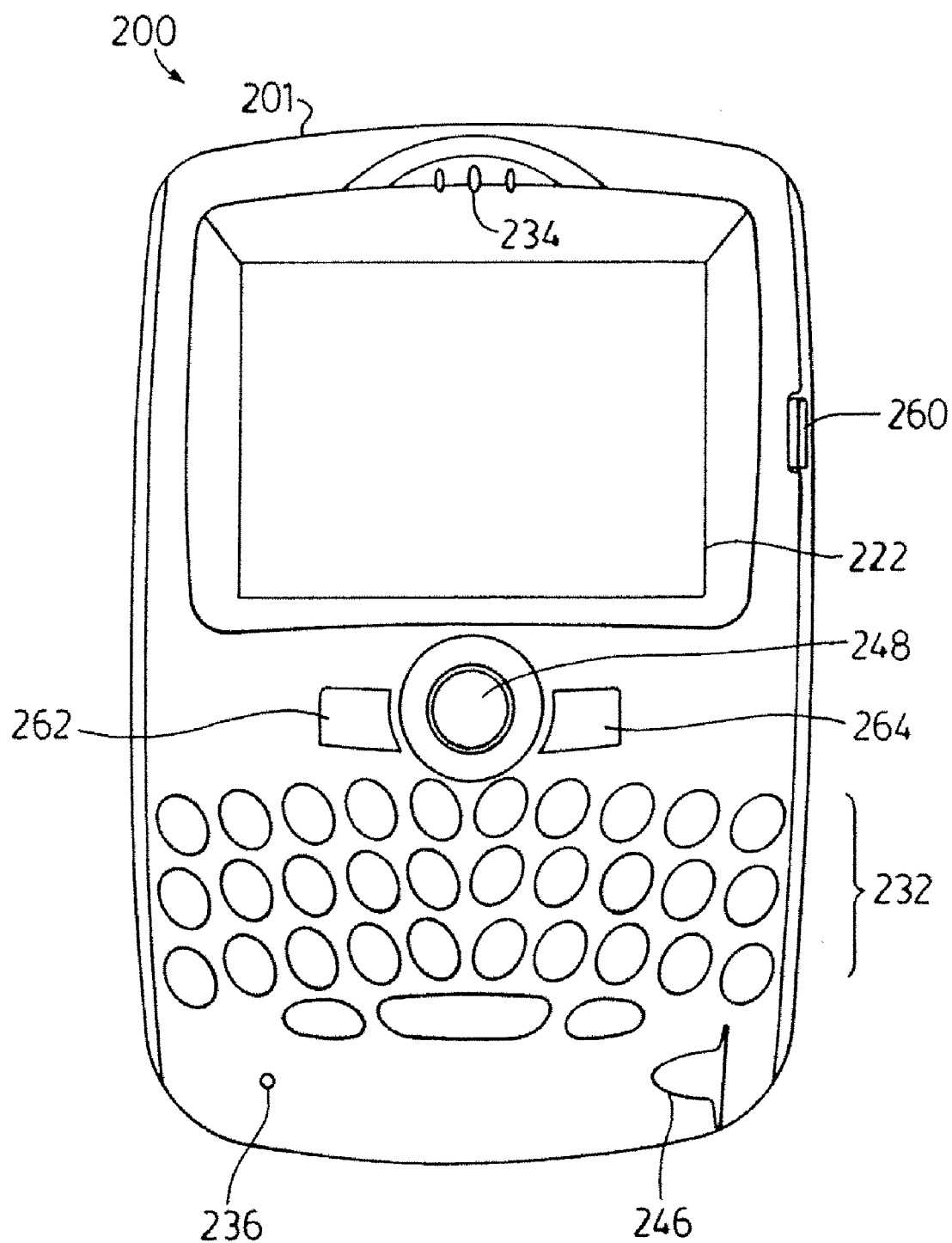
FIG. 2 is a front plan view of the handheld communications device depicted in FIG. 1.

Referring now to FIG. 2, there is shown a sample handheld communications device 200 in accordance with the invention. Preferably, the handheld communications device 200 is a two-way wireless communications device having at least voice and data communication capabilities, and is configured to operate within the wireless cellular network 219 and/or the local area wireless network 221. Further, preferably the handheld communications device 200 has the capability to communicate with other computer services that are available via the Internet, such as the e-mail service 800 and the web server 900. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

As shown, the handheld communications device 200 includes a display 222, a function key 246, and data processing means 202 (not shown) disposed within a common housing 201. The display 222 comprises a backlit LCD display. The data processing means 202 is in communication with the display 222 and the function key 246. In one implementation, the backlit display 222 comprises a transmissive LCD display, and the function key 246 operates as a power on/off switch. Alternately, in another implementation, the backlit display 222 comprises a reflective or trans-reflective LCD display, and the function key 246 operates as a backlight switch.

In addition to the display 222 and the function key 246, the handheld communications device 200 includes user data input means for inputting data to the data processing means 202. As shown, preferably the user data input means includes a keyboard 232, a trackball 248 and an escape key 260. The keyboard 232 includes alphabetic and numerical keys, and preferably also includes a "Call" key 262 and an "End" key 264 to respectively initiate and terminate voice communication. However, the data input means is not limited to these forms of data input. For instance, the data input means may include a thumbwheel or other pointing device instead of (or in addition to) the trackball 248.

Figure 3:
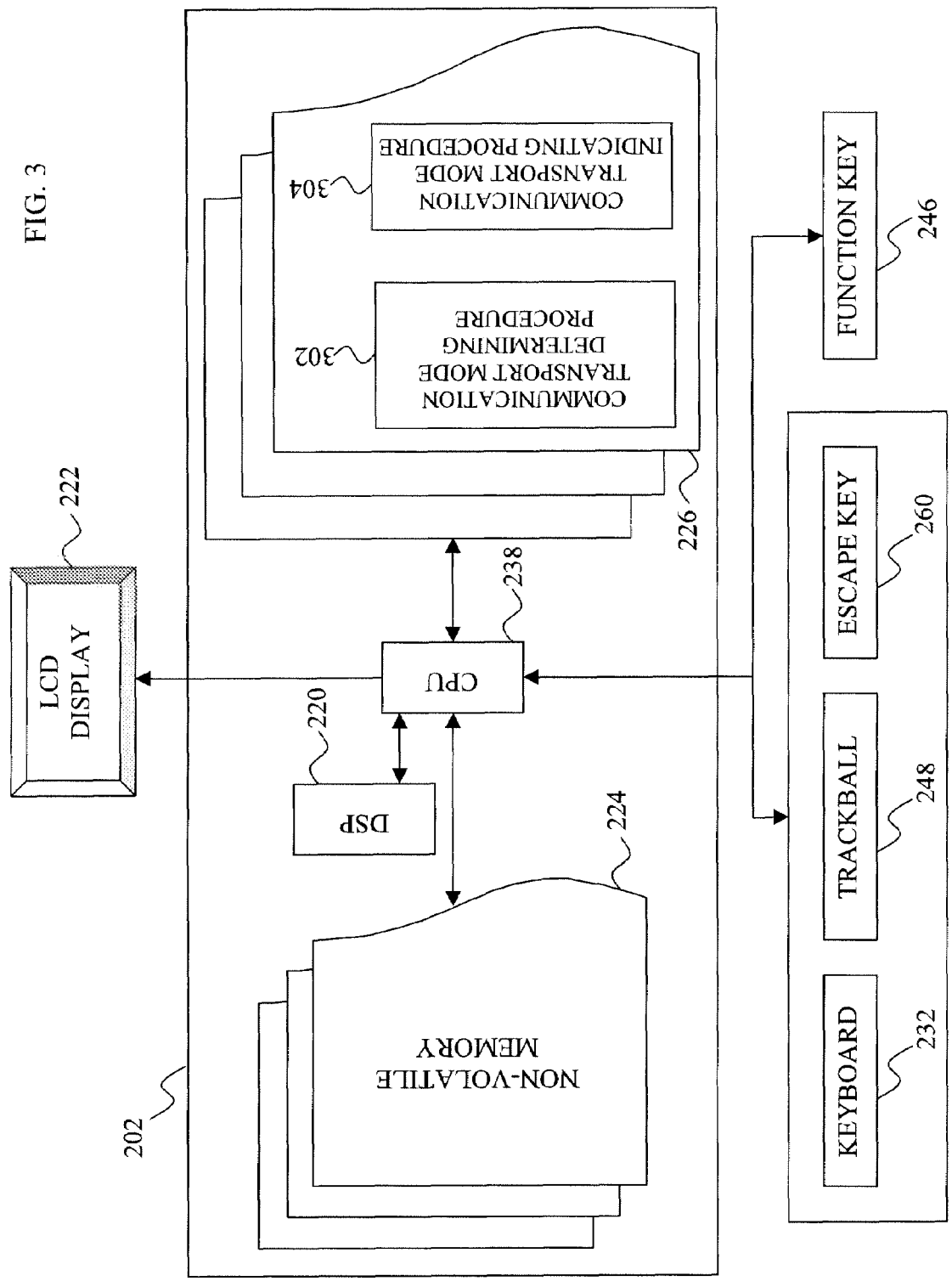
FIG. 3 is a schematic diagram depicting certain functional details of the data processing means of the handheld communications device, including the communication transport mode determining means, and the communication transport mode indicating means.

As shown in FIG. 3, the data processing means 202 comprises a microprocessor 238 in communication with flash memory 224 and volatile memory (RAM) 226. The flash memory 224 includes computer processing instructions which, when executed by the microprocessor 238, implement an operating system, computer programs, and operating system specific applications. The operating system comprises an Open Systems Interconnection (OSI) communication protocol stack that allows the handheld communications device 200 to send and receive communication signals over the wireless cellular network 219 and the local area wireless network 221. Alternately, the computer processing instructions may be copied from the flash memory 224 into the RAM 226 upon system reset or power-up, and executed by the microprocessor 238 out of the RAM 226.

The operating system also includes a communication transport mode determining procedure 302, and a communication transport mode indicating procedure 304. The functions of the communication transport mode determining procedure 302 and the communication transport mode indicating procedure 304 will be discussed in greater detail below. However, it is sufficient at this point to note that the communication transport mode indicating procedure 304 is in communication with the communication transport mode determining procedure 302, and that the communication transport mode determining procedure 302 and the communication transport mode indicating procedure 304 together comprise a method that provides a user-indication of the communication transport mode for the data packets that are received or transmitted by the handheld communications device 200.

Preferably, the communication transport mode determining procedure 302 occupies the network layer of the operating system, and the communication transport mode indicating procedure 304 occupies the application layer of the operating system to allow the user of the handheld communications device to adjust the configuration of the user-indication of the communication transport mode.

It should also be understood that although the communication transport mode determining procedure 302 and communication transport mode indicating procedure 304 are preferably implemented as a set of computer processing instructions, these procedures may be implemented in electronics hardware instead.

Figure 4:
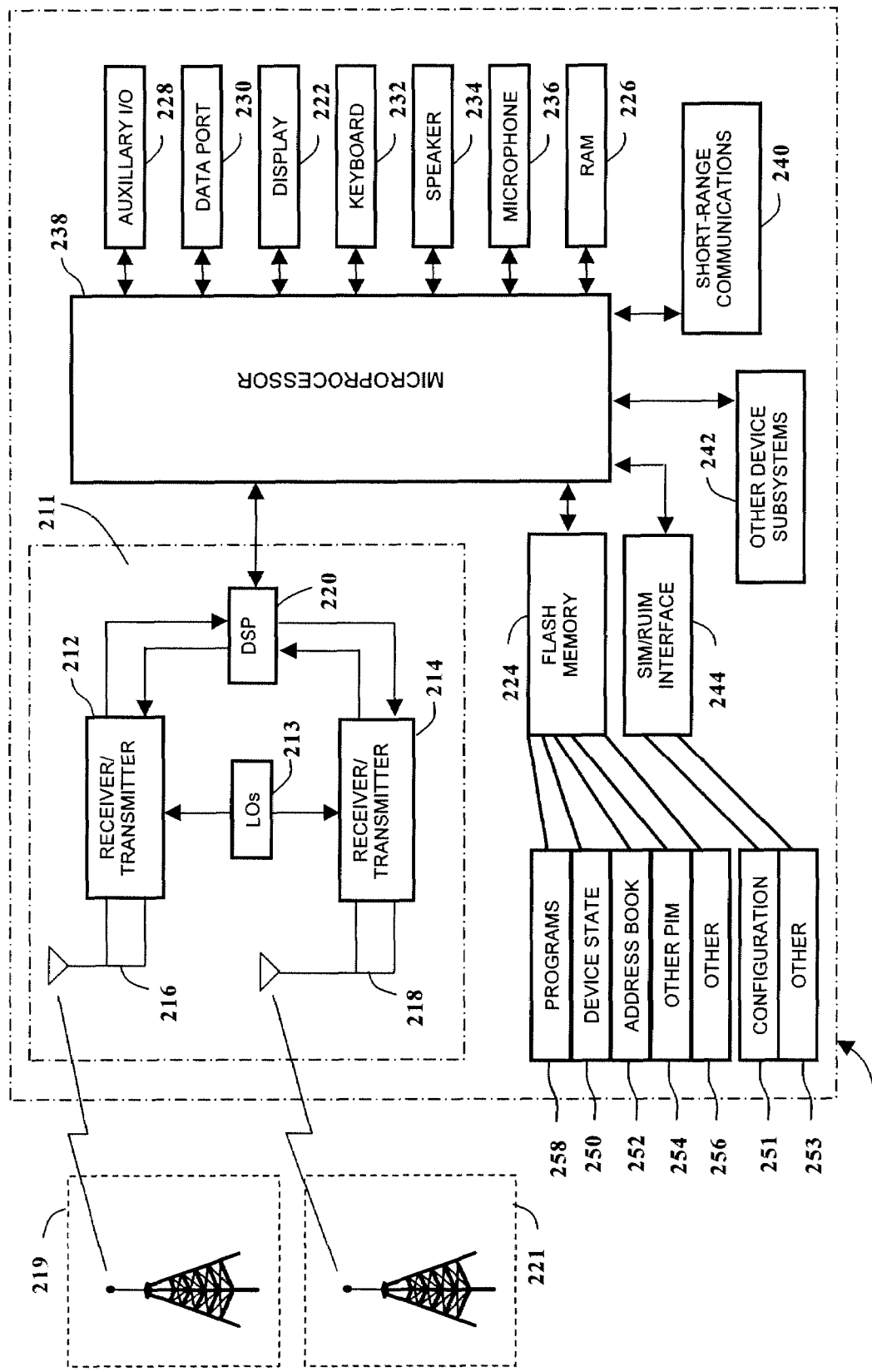
FIG. 4 is a schematic diagram depicting certain additional functional details of the handheld communications device, including the data transceivers.

FIG. 4 depicts functional details of the handheld communications device 200. As shown, the handheld communications device 200 incorporates a motherboard that includes a communication subsystem 211, and the microprocessor 238. Further, the communications device 200 also includes a SIM interface 244 if the handheld communications device 200 is intended for use within a GSM network, and/or a RUIM interface 244 if the handheld communications device 200 is intended for use within a CDMA network. The communication subsystem 211 performs communication functions, such as data and voice communications, and includes a primary transmitter/receiver 212, a secondary transmitter/receiver 214, a primary internal antenna 216 for the primary transmitter/receiver 212, a secondary internal antenna 218 for the secondary transmitter/receiver 214, and local oscillators (LOs) 213 and one or more digital signal processors (DSP) 220 coupled to the transmitter/receivers 212, 214.

The communication subsystem 211 sends and receives wireless communication signals over the wireless cellular network 219 via the primary transmitter/receiver 212 and the primary internal antenna 216. The communication subsystem 211 also sends and receives wireless communication signals over the local area wireless network 221 via the secondary transmitter/receiver 214 and the secondary internal antenna 218.

Signals received by the primary internal antenna 216 from the wireless cellular network 219 are input to the receiver section of the primary transmitter/receiver 212, which performs common receiver functions such as frequency down conversion, and analog to digital (A/D) conversion, in preparation for more complex communication functions performed by the DSP 220. Signals to be transmitted over the wireless cellular network 219 are processed by the DSP 220 and input to transmitter section of the primary transmitter/receiver 212 for digital to analog conversion, frequency up conversion, and transmission over the wireless cellular network 219 via the primary internal antenna 216.

Similarly, signals received by the secondary internal antenna 218 from the local area wireless network 221 are input to the receiver section of the secondary transmitter/receiver 214, which performs common receiver functions such as frequency down conversion, and analog to digital (A/D) conversion, in preparation for more complex communication functions performed by the DSP 220. Signals to be transmitted over the local area wireless network 221 are processed by the DSP 220 and input to transmitter section of the secondary transmitter/receiver 214 for digital to analog conversion, frequency up conversion, and transmission over the local area wireless network 221 via the secondary internal antenna 218. As discussed above, the communication subsystem 211 may include more than one DSP 220, in which case the signals transmitted and received by the secondary transmitter/receiver 214 would preferably be processed by a different DSP than the primary transmitter/receiver 212.

The SIM/RUIM interface 244 is similar to a card-slot into which a SIM/RUIM card can be inserted and ejected like a diskette or PCMCIA card. The SIM/RUIM card holds many key configurations 251, and other information 253 including subscriber identification information, such as the International Mobile Subscriber Identity (IMSI) that is associated with the handheld communications device 200, and subscriber-related information, such as the unique PIN that is assigned to the handheld communications device 200.

The microprocessor 238 controls the overall operation of the device, interacting with device subsystems such as the display 222, flash memory 224, RAM 226, auxiliary input/output (I/O) subsystems 228, data port 230, keyboard 232, speaker 234, microphone 236, short-range communications subsystem 240, and device subsystems 242. The data port 230 may comprise a RS-232 port, a Universal Serial Bus (USB) port or other wired data communication port.

As shown, the flash memory 224 includes both computer program storage 258 and program data storage 250, 252, 254 and 256. Computer processing instructions are preferably also stored in the flash memory 224 or other similar non-volatile storage. Other computer processing instructions may also be loaded into a volatile memory such as RAM 226. The computer processing instructions, when accessed from the memory 224, 226 and executed by the microprocessor 238 define the operating system, computer programs, operating system specific applications. The computer processing instructions may be installed onto the handheld communications device 200 upon manufacture, or may be loaded through the wireless network 219, the auxiliary I/O subsystem 228, the data port 230, the short-range communications subsystem 240, or the device subsystem 242.

The operating system allows the handheld communications device 200 to operate the display 222, the auxiliary input/output (I/O) subsystems 228, data port 230, keyboard 232, speaker 234, microphone 236, short-range communications subsystem 240, and device subsystems 242. Typically, the computer programs include communication software that configures the handheld communications device 200 to receive one or more communication services.

For instance, preferably the communication software includes internet browser software, e-mail software, telephone software and GPS-mapping software that respectively allow the handheld communications device 200 to communicate with various computer servers over the internet, send and receive e-mail, initiate and receive telephone calls, and view electronic maps. Further, preferably the communication mode determining procedure 302 is configured with information identifying the communication mode(s) that support each communication service, and the communication service associated with each communication program.

In data communication mode, a received text message or web page download will be processed by the communication subsystem 211 and output to the display 222, or alternatively to an auxiliary I/O device 228. A user of the handheld communications device 200 may compose data items such as email messages for example, using the keyboard 232. Such composed items may then be transmitted over the wireless cellular network 219 or the local area wireless network 221 through the communication subsystem 211.

For voice communications, overall operation of the handheld communications device 200 is similar, except that received signals would preferably be output to the speaker 234 and signals for transmission would be generated by a microphone 236. Further, the display 222 may provide an indication of the identity of a calling party, the duration of a voice call, or other voice call related information for example.

Figure 5:
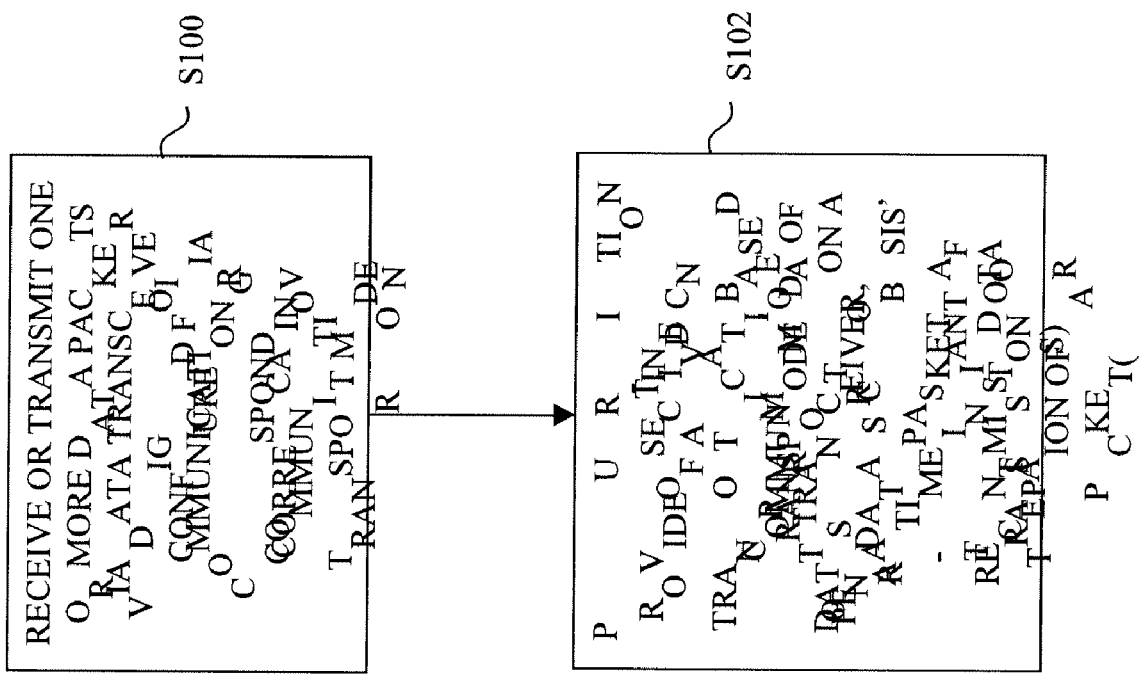
FIG. 5 is a flow chart depicting, by way of overview, the method performed by the handheld communications device when providing a user-indication of the communication transport mode for the received data packet(s)

FIG. 5 is a flow chart that depicts, by way of overview, the method implemented in the handheld communications device 200 for providing a user-indication of the communication transport mode for the data packets that are received by the handheld communications device 200. The communication device 200 is configured to implement a plurality of wireless transport modes of communication.

At step S100, the handheld communications device 200 receives one or more data packets. The handheld communications device 200 may have received the data packet(s) from one of the networks 219, 221, or from the communication software that is installed on the handheld communications device 200.

The data packet(s) is/are associated with one of the communication transport modes that are recognized by the handheld communications device 200. Each data transceiver of the handheld communications device 200 is configured for communication using a respective one of the recognized communication transport modes. Therefore, the handheld communications device 200 transmits or receives the data packet(s) via the data transceiver that is configured for communication using the corresponding communication transport mode.

In the example shown in FIG. 1, the wireless cellular network 219 comprises one wireless transport mode, and the local area wireless network 221 comprises another wireless transport mode, and the first and second data receiver/transmitters 216, 218 are respectively configured for communication via the wireless cellular network 219 and the local area wireless network 221. However, the invention is not so limited. For instance, in one variation, the communications network 100 includes a plurality of non-overlapping local area wireless networks 221, in which case each local area wireless network 221 comprises a distinct mode of wireless communication. Further, the communication transport modes need not be wireless transport modes, but could include wired transport modes. For instance, the USB data port 230 could comprise one communication transport mode.

Based on the data transceiver that is associated with the data packet(s), the handheld communications device 200 provides a user-indication of the "active" communication transport mode (the communication transport mode for the data packet(s)), at step S102. The user-indication is provided substantially contemporaneously with the communication of the data packet(s). Preferably, the communication device 200 provides a visual indication of the active communication transport mode via the display 222. However, other user-indications are contemplated by the invention, such as audio indications via the speaker 234. Further, the user indications may comprise combinations of a combination of these notification mechanisms.

Figure 6A:
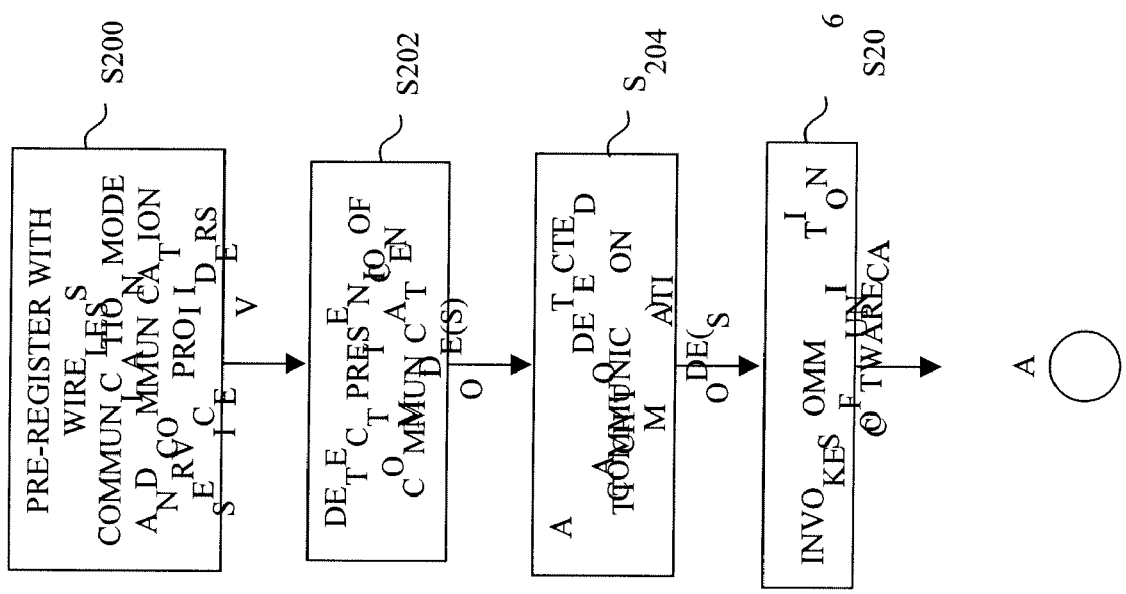
FIG. 6 (comprising FIGS. 6a to 6c) is a flow chart depicting, in detail, the method performed by the handheld communications device when providing the user-indication of the communication transport mode.
Figure 6B:
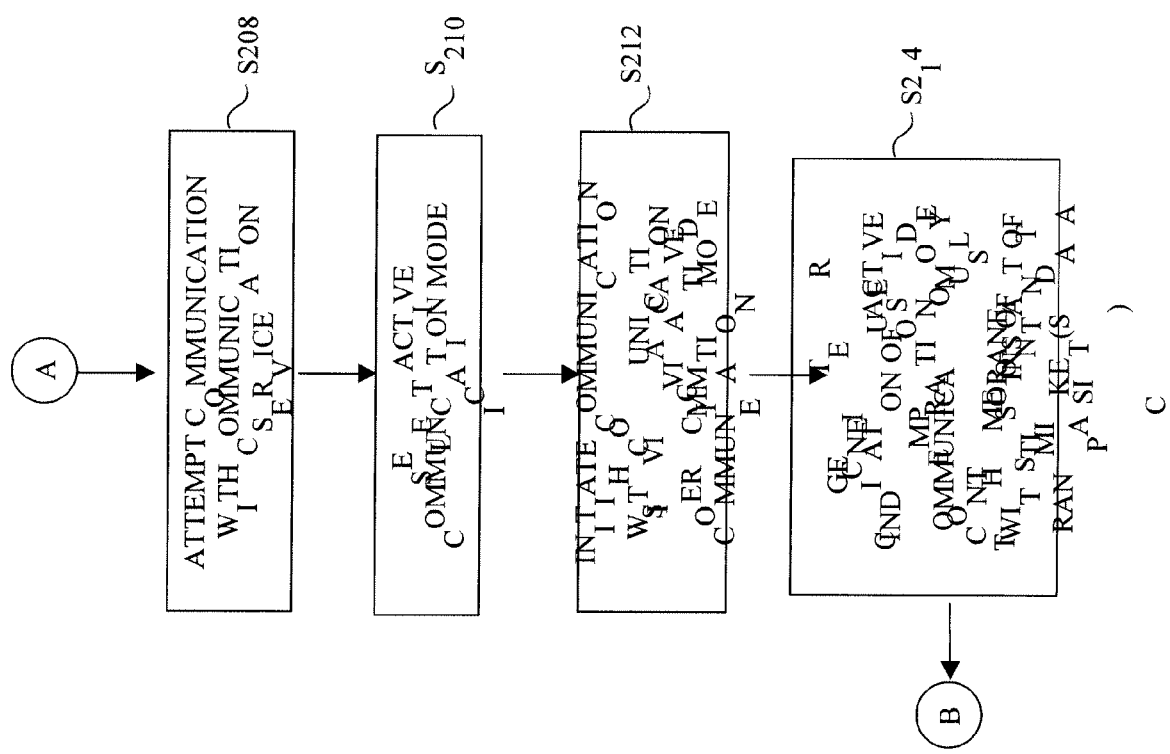

FIG. 6 depicts, in detail, the sequence of steps performed by the handheld communications device 200 when providing a user-indication of the active communication transport mode. At step S200, the user of the handheld communications device 200 pre-registers to have access to one or more wireless communication transport modes, if required. For instance, typically a user must pre-register (i.e. subscribe to a wireless coverage plan) to have access to the wireless cellular network 219. Alternately, however, typically a user need not pre-register to have access to the local area wireless network 221. However, the local wireless node 600 might be implemented at a café, in which case access to the local area wireless network 221 might be restricted to customers of the café.

At step S200, the user of the handheld communications device 200 also pre-registers to have access to one or more services on the handheld communications device 200. In the example shown in FIG. 1, the communication services comprise the e-mail service 800 and the web server 900. However, as discussed above, the communication services may also include other services, such as a telephony service, a text messaging service, a virtual private network (VPN) service, and/or a global positioning system (GPS)-mapping service.

One or more of these communication services may be pay-for-use services. For instance, the e-mail service 800, the telephony service, and the text messaging service may be available only by subscription. Accordingly, at step S200, the user of the handheld communications device 200 pre-registers with the provider of the pay-for-use service(s) prior to gaining access to the service. The service provider of the pay-for-use service maintain records for each registered user of the pay-for-use communication service.

Other communication services may be restricted, for security reasons, to certain pre-authorized users. For instance, the web server 900 may comprise a business intranet, which is available only to authorized employees. A business VPN service would also typically be available only to authorized employees. Accordingly, at step S200, the user of the handheld communications device 200 also pre-registers with the provider of the restricted service(s) prior to gaining access to the service. As above, the service provider maintain records for each registered user of the restricted communication service.

Conversely, other communication services may be unrestricted. For instance, the web service 900 and the GPS-mapping service may be publicly available. The user of the handheld communications device 200 would not have to register with the provider of the unrestricted services, at step S200, to gain access to the service.

After the user of the handheld communications device 200 pre-registers with the wireless communication transport modes and communication service providers (as may be required), at step S202 the communications device 200 detects the communication transport modes that are available to the communications device 200 in the geographical region in which the communications device 200 is currently located. To do so, the communication transport mode determining procedure 302 determines the signal strength of the RF carrier signals that are received at the primary internal antenna 216 and the secondary internal antenna 218.

At step S204, the communication mode authorization procedure 302 attempts to attach to the detected communication mode(s). If the communication transport mode determining procedure 302 detects only the presence of a single communication transport mode, and the signal strength of the detected communication mode is greater than a minimum threshold level, the communication transport mode determining procedure 302 attempts to attach to that detected communication transport mode. However, more than one communication transport mode may be available to the handheld communications device 200, with the signal strength of each communication mode being greater than the respective minimum threshold level. Therefore, preferably the communication transport mode determining procedure 302 is configured to attempt to attach to each detected communication transport mode whose signal strength is greater than a minimum threshold level.

To attach to a detected communication transport mode, typically the communication transport mode determining procedure 302 transmits subscriber information to the communication mode provider, if required by the detected communication mode. If the user of the handheld communications device 200 is authorized to use the detected communication transport mode, the communication mode provider responds to the communication transport mode determining procedure 302 with a confirmatory notice.

For instance, if the detected communication mode is a GSM network 219, and the handheld communications device 200 has recently powered up and is configured with communication protocol software for GSM communication, the communication transport mode determining procedure 302 attempts to register with the GSM network by transmitting the IMSI of the handheld communications device 200 to the GSM network provider. If the user of the handheld communications device 200 is authorized to use the detected communication mode, the network provider responds to the IMSI with a Temporary Mobile Subscriber Identity (TMSI).

Similarly, if the handheld communications device 200 is configured with communication protocol software for data (e.g. GPRS/EDGE) communication, the communication transport mode determining procedure 302 attempts to register for GPRS/EDGE data communication with the core network 500 by issuing an attach request to the core network 500. If the core network 500 previously assigned a Packet-TMSI (P-TMSI) to the handheld communications device 200, the attach request includes the P-TMSI, the routing area identity (RAI) of the routing area where the P-TMSI was assigned, and information concerning the data communication capabilities of the handheld communications device 200 (e.g. supported frequency bands, ciphering capabilities). If the user of the handheld communications device 200 is authorized to use the detected communication mode, the core network 500 responds to the handheld communications device 200 with an attach accept message, which includes a new P-TMSI.

If the detected communication mode is a WiFi (IEEE 802.11x) network 221, and the handheld communications device 200 is configured with communication protocol software for WiFi communication, the communication transport mode determining procedure 302 listens for the Service Set Identifier (SSID) that is broadcast (if any) by the base station 602 of the local wireless node 600, and then connects to the local wireless node 600 having the specified SSID. Further, if access to the WiFi network 221 is restricted to pre-registered users of the WiFi network 221, the handheld communication device 100 transmits to the base station 602 the user's assigned username/password to thereby gain access to the WiFi network 221.

Step S204 may involve multiple attach attempts, particularly where more than one communication transport mode is detected, but the communication transport mode determining procedure 302 determines that it is not authorized to use one of the detected communication transport modes. Therefore, in the event that the communication transport mode determining procedure 302 attempts to attach to one of the detected communication transport modes, and determines that it is not authorized to use that communication mode, the communication transport mode determining procedure 302 still attempts to attach to the other detected communication transport mode(s) (if available).

After the handheld communications device 200 has successfully attached to one or more of the detected communication transport modes, at step S206 the user of the handheld communications device 200 may invoke data communication software on the handheld communications device 200 for data communication with a provider of a desired communication service. Alternately, the operating system may have automatically invoked the data communication software.

The invoked data communication software may be configured to facilitate data communication with the communication service provider via one or more communication transport modes. Further, as discussed above, the invoked data communication software may be (but is not limited to) the e-mail software, the telephone software, the internet browser, and/or the GPS-mapping software.

The invoked data communication software attempts to communicate with the associated one of the data communication service providers. To do so, at step S208 the communication software requests that the communication transport mode determining procedure 302 open a communication channel with the data communication service provider that is associated with the invoked communication software.

For instance, if internet browser software was invoked, the communication software will request the communication transport mode determining procedure 302 initiate data communication with one or more of the web servers 900. If the e-mail software was invoked, the communication software will request the communication transport mode determining procedure 302 initiate data communication with the e-mail service 800.

In response, at step S210 the communication transport mode determining procedure 302 selects one of the communication transport modes as the active communication transport mode. The communication transport mode selected by the communication transport mode determining procedure 302, at step S210, depends, in part, upon the communication mode(s) to which the communication transport mode determining procedure 302 successfully attached.

For instance, if the communication transport mode determining procedure 302 only successfully attached to the wireless cellular network 219, and the requested data communication service is available via the communication transport mode that is supported on that network (e.g. GPRS or EDGE), the communication transport mode determining procedure 302 will select "cellular" as the active communication transport mode. Conversely, if the communication transport mode determining procedure 302 only successfully attached to the local area wireless network 221, and the requested data communication service is available via the communication transport mode that is supported on that network, the communication transport mode determining procedure 302 will select "WiFi" as the active communication transport mode.

The communication mode selected by the communication transport mode determining procedure 302, at step S210, also depends on the availability of the data communication service via the respective communication mode(s). Accordingly, as discussed above, preferably the communication mode determining procedure 302 is configured with information identifying the communication mode(s) that support each communication service, and the communication service associated with each communication program. Therefore, if the communication transport mode determining procedure 302 successfully attached to more than one communication transport mode, preferably the communication transport mode determining procedure 302 is configured to select a preferred communication transport mode as the active communication transport mode if the requested data communication service is available via more than one of these communication transport modes. Conversely, if the requested data communication service is only available via one of these communication transport modes, the communication transport mode determining procedure 302 selects the communication transport mode that can provide the requested communication service.

For instance, if the handheld communications device 200 is authorized to use both the wireless cellular network 219 and the local area wireless network 221, and the requested data communication service is available via GPRS/EDGE and WiFi communication transport modes, to reduce communication costs preferably the communication transport mode determining procedure 302 selects "WiFi" as the active communication transport mode. However, if the requested data communication service is only available via GPRS/EDGE, the communication transport mode determining procedure 302 selects "cellular" as the active communication transport mode, notwithstanding that the local area wireless network 221 is otherwise available to the handheld communications device 200.

If none of the foregoing conditions are met (e.g. the handheld communications device 200 does not detect the presence of any communication transport mode, or none of the detected communication transport modes are available to the handheld communications device 200, or the service associated with the invoked communications software is not available via any of the authorized detected communication transport modes), the communication transport mode determining procedure 302 does not select an active communication transport mode.

At step S212, the communication transport mode determining procedure 302 opens a communication channel with the communication service via the active communication transport mode. The invoked communication software then transmits one or more data packet to the associated service provider via the active communication transport mode.

At step S214, the communication transport mode indicating procedure 304 determines the active communication transport mode from the communication transport mode determining procedure 302, and then generates a user indication of the active communication transport mode. Preferably, the communication transport mode indicating procedure 304 begins to generate the communication transport indicia substantially contemporaneously with the time instant that the handheld communications device 200 beings to transmit the data packet(s) via the respective transmitter/receiver 212, 214, to thereby indicate that the handheld computing device 200 is currently transmitting the data packet(s). Conversely, preferably the communication transport mode indicating procedure 304 also extinguishes the communication transport indicia substantially contemporaneously with the time instant that the handheld communications device 200 completes the transmission of the data packet(s) via the respective transmitter/receiver 212, 214, to thereby indicate that the handheld computing device 200 has finished transmitting the data packet(s).

Further, the communication transport mode indicating procedure 304 is configured to generate the communication transport indicia with a different configuration for each different active communication transport mode. For instance, if one communication transport mode comprises a long-range communication protocol (e.g. EDGE or GPRS), and another communication transport mode comprises a shorter range communication protocol (e.g. IEEE 802.11x or Bluetooth), one configuration of the communication transport indicia indicates the long-range communication protocol, while another configuration indicates the shorter range communication protocol. If one communication transport mode comprises a slow-speed communication protocol, and another communication transport mode comprises a higher speed communication protocol, one configuration of the communication transport indicia indicates the slow-speed communication protocol, while another configuration indicates the higher speed communication protocol.

Preferably, the communication transport mode indicating procedure 304 renders the transport mode user indicia on the display 222, with a different appearance each communication transport mode. For instance, the communication transport mode indicating procedure 304 may render the transport mode indicia as an icon having one colour for one communication transport mode, and with a differently-coloured icon for another communication transport mode. The communication transport mode indicating procedure 304 may render the transport mode indicia as an icon having one shape for one communication transport mode, and with a differently-shape icon for another communication transport mode. The communication transport mode indicating procedure 304 may render the transport mode indicia as an icon with one shape and colour for one communication transport mode, and with a different-shapely and -coloured icon for another communication transport mode. If the communication transport mode determining procedure 302 did not select an active communication mode, the communication transport mode indicating procedure 304 does not render a communication transport mode indicia.

Further, preferably the handheld communications device 200 renders on the display 222 a plurality of different display or information screens, and the communication transport mode indicating procedure 304 renders the communication transport mode icon in a communication status region of the display 222, with the status region being visible on a plurality of the information screens. For instance, preferably the handheld communications device 200 renders a "home" window from which some of the software programs installed on the handheld communications device 200 can be invoked. Further, the handheld communications device 200 may render an e-mail window for displaying information transmitted or received via the e-mail communication software, a browser window for displaying information transmitted or received via the browser communication software, and/or a telephone window for displaying information transmitted or received via the telephony communication software. Preferably, the communication transport mode icon is visible from each such window.

Subsequently, a communication service may transmit one or more data packets to the handheld communications device 200. In this case, at step S216 the handheld communications device 200 would receive the data packet(s) via the transmitter/receiver 212, 214 whose associated communication transport mode corresponds to the communication transport mode of the data packet(s). For example, if the received data packet(s) is/are associated with the GPRS or EDGE data communication protocol, since this communication protocol is carried by the cellular network 219 (to which the primary transmitter/transmitter 212 is attached), the handheld communications device 200 will receive the data packet(s) via the primary transmitter/receiver 212. If the received data packet(s) is/are associated with the IEEE 802.11x data communication protocol, since this communication protocol is carried by the WiFi network 221 (to which the secondary transmitter/transmitter 214 is attached), the handheld communications device 200 will receive the data packet(s) via the secondary transmitter/receiver 214.

In response, at step S218 the communication transport mode determining procedure 302 selects, as the active communication transport mode, the communication transport mode that is associated with the transmitter/receiver 212, 214 that received the data packet(s). As discussed above, preferably the communication mode determining procedure 302 is configured with information identifying the communication mode(s) that support each communication service, and the communication service associated with each communication program. Therefore, preferably the communication mode determining procedure 302 also forwards the received data packet(s) to the appropriate communication program.

At step S220, the communication transport mode indicating procedure 304 again determines the active communication transport mode from the communication transport mode determining procedure 302, and generates a user indication of the active communication transport mode. Preferably, the communication transport mode indicating procedure 304 generates the communication transport indicia substantially contemporaneously with the time instant the data packet(s) are received via the respective transmitter/receiver 212, 214, to thereby indicate that the handheld computing device 200 is currently receiving the data packet(s). Conversely, preferably the communication transport mode indicating procedure 304 also extinguishes the communication transport indicia substantially contemporaneously with the time instant that the handheld communications device 200 completes reception of the data packet(s) via the respective transmitter/receiver 212, 214, to thereby indicate that the handheld computing device 200 has finished receiving the data packet(s).

The communication transport mode determining procedure 302 periodically determines the communication modes that are available to the handheld communications device 200, and notifies the communication transport mode indicating procedure 304 of the active communication mode whenever the handheld communications device 200 receives or transmits data packets over one of the available communication transport modes. Therefore, if the handheld communications device 200 moves from a region that serviced by one communication transport mode to a region that is serviced by another communication transport mode, the communication transport mode indicating procedure 304 will dynamically provide a user-indication of the new active communication transport mode. The communication software continues communication with the communication service provider via the new active communication transport mode, to the extent that the communication service is available over the new active communication transport mode.

Figure 7:
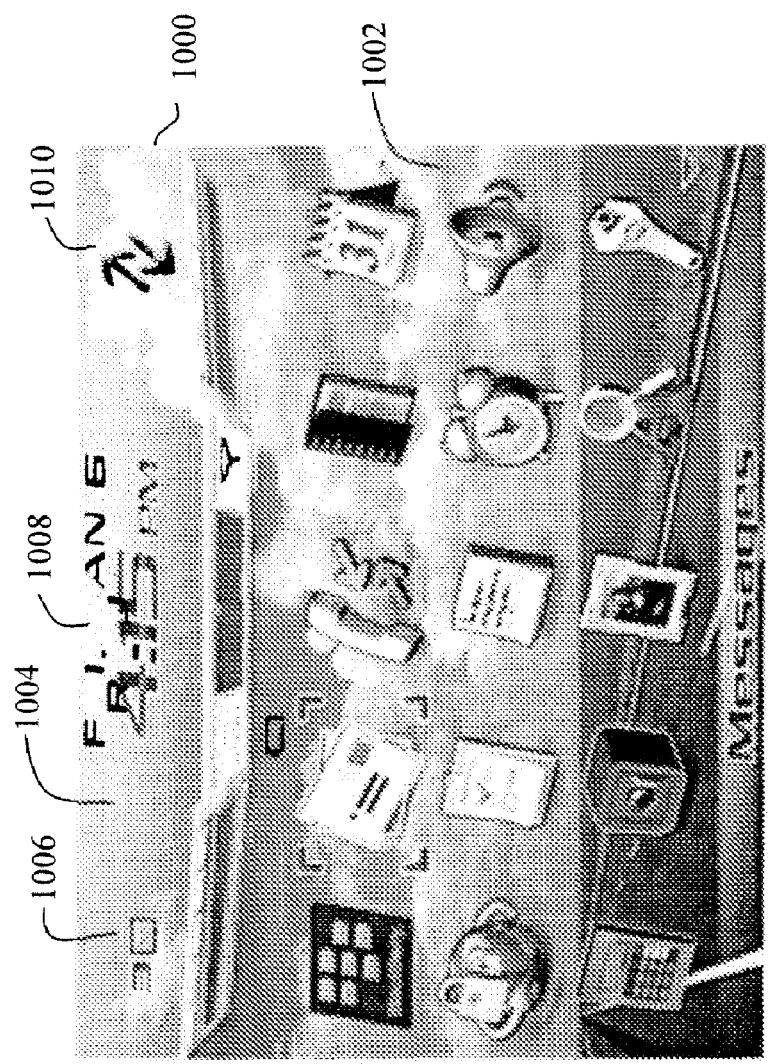
FIG. 7 is a screenshot that depicts a sample user-indication of the communication transport mode for EDGE data communication.
Figure 8:
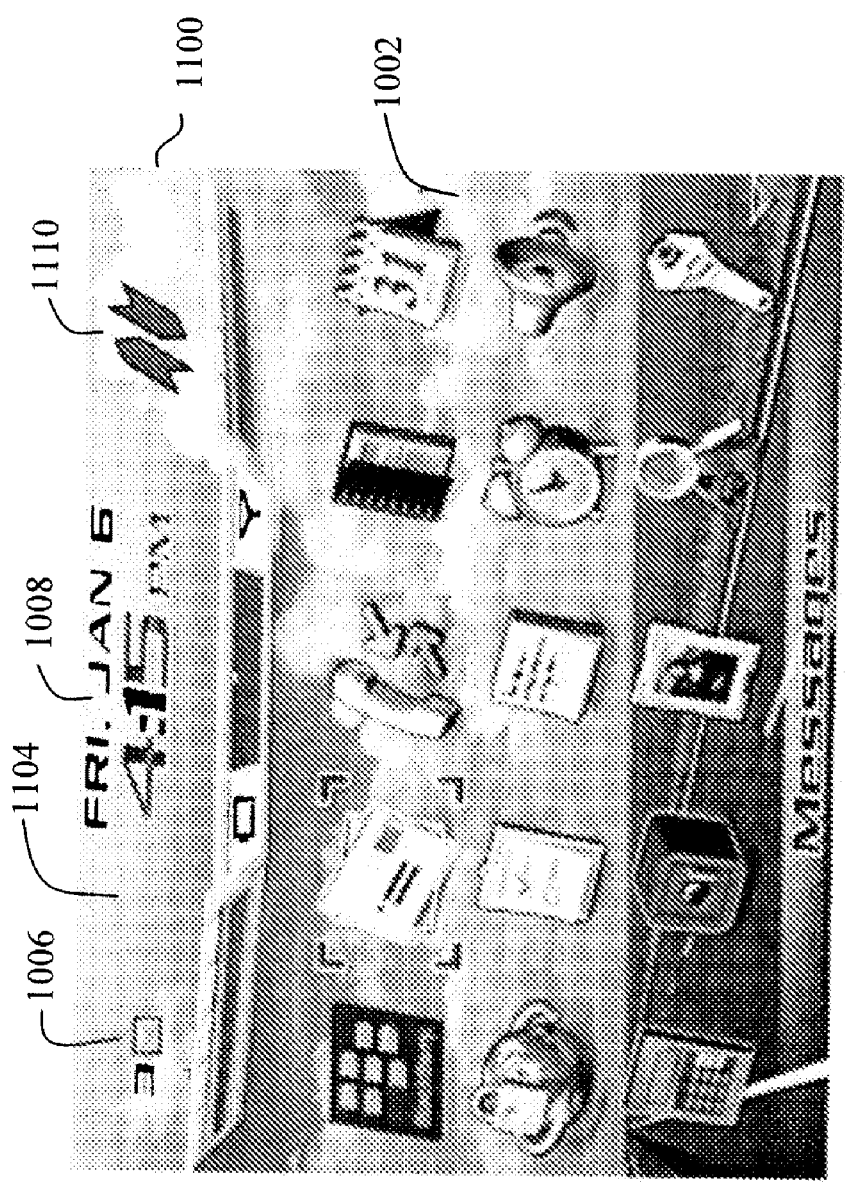
FIG. 8 is a screenshot that depicts a sample user-indication of the communication transport mode for WiFi data communication.

Sample information windows, depicting preferred examples of communication transport mode icons in a status bar of the display 222, are shown in FIGS. 7 and 8.

FIG. 7 depicts a "home" window 1000 which includes an application icon region 1002, and a status bar 1004 above the application icon region 1002. The application icon region 1002 includes several icons which, if selected, invoke a corresponding software on the handheld communications device 200. The status region 1004 includes an e-mail read status icon 1006, a calendar icon 1008, and an EDGE communication transport mode icon set 1110.

The e-mail read status icon 1006 indicates whether the e-mail communication software has any unread e-mail messages. The calendar icon 1008 displays the current date and time. The EDGE communication transport mode icon set 1110 comprises a pair of graphic arrows. One arrow ("receipt icon"), when rendered, indicates that the handheld communications device 200 is receiving one or more data packets via a communication transport mode that supports EDGE data communication protocol. The other arrow ("transmit icon"), when rendered, indicates that the handheld communications device 200 is transmitting one or more data packets via a communication transport mode that supports the EDGE communication transport mode.

Preferably, the communication transport mode indicating procedure 304 renders the receipt icon when the handheld communications device 200 is receiving the data packet(s), and extinguishes the receipt icon when the data reception is complete. Similarly, preferably the communication transport mode indicating procedure 304 renders the transmit icon when the handheld communications device 200 is transmitting the data packet(s), and extinguishes the transmit icon when the data transmission is complete. However, it should be understood that the EDGE communication transport mode icon set 1110 need not comprise multiple icons, but could comprise only a single icon for indicating both reception and transmission of data packets.

FIG. 8 depicts another "home" window 1100, which is a variant of the "home" window of FIG. 7. The "home" window 1100 includes the same application icon region 1002, and a status region 1104. The status region 1104 is substantially identical to the status region 1004, in that it includes the e-mail read status icon 1006 and the calendar icon 1008. However, in contrast to the status region 1004, the status region 1104 includes a WiFi communication transport mode icon set 1110.

The WiFi communication transport mode icon set 1110 comprises a pair of graphic arrows which have a different appearance than the EDGE communication transport mode icon set 1010. One arrow of the WiFi communication transport mode icon set 1110, when rendered, indicates that the handheld communications device 200 is receiving one or more data packets via a communication transport mode that supports WiFi communication transport mode. The other arrow, when rendered, indicates that the handheld communications device 200 is transmitting one or more data packets via a communication transport mode that supports the WiFi communication transport mode. Again, as discussed above, the WiFi communication transport mode icon set 1110 need not comprise multiple icons, but could comprise only a single icon for indicating both reception and transmission of data packets.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

I claim:

1. A method of communication in a handheld communication device capable of a plurality of communication transport modes, the method comprising the steps of:
   receiving at least one data packet at the handheld communication device, the handheld communication device comprising a plurality of data transceivers, each said data transceiver being configured for communication via a respective one of the communication transport modes, the at least one data packet being associated with one of the communication transport modes, the handheld communication device communicating the at least one data packet via one of the data transceivers, the one data transceiver being configured for communication via the one communication transport mode; and
   providing a user-indication of the one communication transport mode for the at least one data packet in accordance with the one data transceiver, by displaying the user indication substantially contemporaneously with a time instant of initiation of transmission or receipt of the at least one data packet at the communication device and extinguishing the user-indication substantially contemporaneously with a time instant of completion of the transmission or the receipt of the at least one data packet at the communication device.

2. The method according to claim 1, wherein the user-indication indicates the communication transport mode and the communication of the at least one data packet.

3. The method according to claim 2, wherein the handheld communication device comprises a display device, the handheld communication device is configured to render a plurality of information screens on the display device, the user-indication comprises an icon, and the user-indication providing step comprises rendering the icon on a communication status region of the display device, the status region being visible on the plurality of information screens.

4. The method according to claim 3, wherein the user-indication providing step comprises rendering the icon with a first icon configuration for one of the communication transport modes, and rendering the icon with a second configuration for another of the communication transport modes, the second icon configuration being different from the first configuration, the icon when rendered with the second icon configuration having a different appearance than the first icon configuration.

5. The method according to claim 4, wherein the first icon configuration comprises a first colour, and the second icon configuration comprises a second colour different from the first colour.

6. The method according to claim 5, wherein the first icon configuration comprises a first shape, and the second icon configuration comprises a second shape different from the first shape.

7. The method according to claim 4, wherein the first icon configuration comprises a first shape, and the second icon configuration comprises a second shape different from the first shape.

8. The method according to claim 4, wherein one of the communication transport modes comprises a long-range wireless cellular communication protocol, and another one of the communication transport modes comprises a shorter range wireless local area network communication protocol, and the rendered icon indicates one of the long-range communication protocol and the shorter range communication protocol.

9. The method according to claim 4, wherein one of the communication transport modes comprises a slow-speed wireless communication protocol, and another one of the communication transport modes comprises a higher speed wireless communication protocol, and the rendered icon indicates one of the slow-speed communication protocol and the higher speed communication protocol.

10. The method according to claim 4, wherein one of the communication transport modes comprises one of a GPRS and an EDGE wireless communication protocol, and another one of the communication transport modes comprises a WiFi communication protocol, and the rendered icon indicates one of the GPRS/EDGE communication protocol and the WiFi communication protocol.

11. The method according to claim 1, wherein the user-indication of the one communication transport mode is user configurable.

12. A communications device comprising:
a plurality of data transceivers, each said data transceiver being configured for communication via a respective one of the communication transport modes;
communication transport mode determining means in communication with the plurality of data transceivers for determining a transport mode of at least one data packet received at the handheld communications device, the handheld communication device being configured to communicate the at least one data packet via one of the data transceivers, the at least one data packet being associated with one of the communication transport modes, the one data transceiver being configured for communication via the one communication transport mode; and
communication transport mode indicating means in communication with the communication transport mode determining means, the communication transport mode indicating means being configured to provide a user-indication of the one communication transport mode for the at least one data packet, the communication transport mode indicating means providing the user indication by displaying the user-indication substantially contemporaneously with a time instant of initiation of transmission or receipt of the at least one data packet at the communication device and extinguishing the user-indication substantially contemporaneously with a time instant of completion of the transmission or the receipt of the at least one data packet at the communication device.

13. The communications device according to claim 12, and the user-indication indicates the communication transport mode and the communication of the at least one data packet.

14. The communications device according to claim 13, further comprising a display device, the communication device being configured to render a plurality of information screens on the display device, the user-indication comprises an icon, and the communication transport mode indicating means is configured to render the icon on a communication status region of the display device, the status region being visible on the plurality of information screens.

15. The communications device according to claim 14, wherein the communication transport mode indicating means is configured to render the icon with a first icon configuration for one of the communication transport modes, and rendering the icon with a second configuration for another of the communication transport modes, the second icon configuration being different from the first configuration, the icon when rendered with the second icon configuration having a different appearance than the first icon configuration.

16. The communications device according to claim 15, wherein one of the communication transport modes comprises a long-range or slow-speed wireless cellular communication protocol, and another one of the communication transport modes comprises a shorter range or higher speed wireless local area network communication protocol, and the rendered icon indicates one of the long range or slow-speed communication protocol and the shorter range or higher speed communication protocol.

17. The communications device according to claim 12, wherein the user-indication of the one communication transport mode is user configurable.

18. A non-transitory computer readable medium carrying processing instructions stored thereon for a handheld communications device, the processing instructions, when executed by a computer processor of the communications device, enabling the handheld communication device to perform the following steps:
receive at least one data packet at the handheld communication device, the handheld communication device comprising a plurality of data transceivers, each said data transceiver being configured for communication via a respective one of the communication transport modes, the at least one data packet being associated with one of the communication transport modes, the handheld communication device communicating the at least one data packet via one of the data transceivers, the one data transceiver being configured for communication via the one communication transport mode; and
provide a user-indication of the one communication transport mode for the at least one data packet in accordance with the one data transceiver, by displaying the user indication substantially contemporaneously with a time instant of initiation of transmission or receipt of the at least one data packet at the communication device and extinguishing the user-indication substantially contemporaneously with a time instant of completion of the transmission or the receipt of the at least one data packet at the communication device.

* * * * *